US012382990B2

(12) United States Patent
Lee et al.

(10) Patent No.: US 12,382,990 B2
(45) Date of Patent: Aug. 12, 2025

(54) CARTRIDGE AND AEROSOL GENERATING APPARATUS COMPRISING THE SAME

(71) Applicant: KT&G CORPORATION, Daejeon (KR)

(72) Inventors: Won Kyeong Lee, Gyeonggi-do (KR); Heon Jun Jeong, Seoul (KR); Jae Sung Choi, Gyeonggi-do (KR)

(73) Assignee: KT&G Corporation, Daejeon (KR)

( * ) Notice: Subject to any disclaimer, the term of this patent is extended or adjusted under 35 U.S.C. 154(b) by 0 days.

(21) Appl. No.: 17/797,913

(22) PCT Filed: Feb. 24, 2022

(86) PCT No.: PCT/KR2022/002709
§ 371 (c)(1),
(2) Date: Aug. 5, 2022

(87) PCT Pub. No.: WO2022/186543
PCT Pub. Date: Sep. 9, 2022

(65) Prior Publication Data

US 2024/0196966 A1 Jun. 20, 2024

(30) Foreign Application Priority Data

Mar. 3, 2021 (KR) ........................ 10-2021-0028349
Apr. 20, 2021 (KR) ........................ 10-2021-0051353

(51) Int. Cl.
*A24F 40/05* (2020.01)
*A24F 40/10* (2020.01)
(Continued)

(52) U.S. Cl.
CPC .............. *A24F 40/05* (2020.01); *A24F 40/10* (2020.01); *A24F 40/42* (2020.01); *A24F 40/50* (2020.01);
(Continued)

(58) Field of Classification Search
None
See application file for complete search history.

(56) References Cited

U.S. PATENT DOCUMENTS 4,338,576 A 7/1982 Mitsui
9,560,882 B2 2/2017 Xiang
(Continued)

FOREIGN PATENT DOCUMENTS

CA 3132357 A1 * 7/2015 ........... A24B 15/167
CN 206482028 U 9/2017
(Continued)

OTHER PUBLICATIONS

English machine translation: CN 202445137 U; published Sep. 26, 2012; inventor: Liu; 10 pages. (Year: 2012).*
(Continued)

*Primary Examiner* — Linda L Gray
(74) *Attorney, Agent, or Firm* — Foley & Lardner LLP

(57) ABSTRACT

A cartridge may include: a housing; a reservoir located in the housing and storing an aerosol generating material; an atomizer located in the housing and configured to generate vibration to atomize the aerosol generating material to an aerosol; a liquid delivery element configured to absorb the aerosol generating material stored in the reservoir and deliver the absorbed aerosol generating material to the atomizer; and a resistor located in the housing and configured to eliminate noise of a signal applied to the atomizer.

14 Claims, 8 Drawing Sheets

(51) Int. Cl.
*A24F 40/42* (2020.01)
*A24F 40/50* (2020.01)
*B06B 1/00* (2006.01)
*B06B 1/06* (2006.01)

(52) U.S. Cl.
CPC ........ *B06B 1/0651* (2013.01); *B06B 2201/77* (2013.01)

(56) References Cited

U.S. PATENT DOCUMENTS

| | | | | |
|---|---|---|---|---|
| 2014/0376895 | A1* | 12/2014 | Han ........................ | A24F 40/40 392/395 |
| 2015/0053217 | A1* | 2/2015 | Steingraber ............. | A24F 40/50 131/329 |
| 2016/0295922 | A1 | 10/2016 | John et al. | |
| 2018/0029053 | A1 | 2/2018 | Aono et al. | |
| 2018/0092406 | A1 | 4/2018 | Monsees et al. | |
| 2019/0045837 | A1 | 2/2019 | Spencer | |
| 2019/0099561 | A1 | 4/2019 | Nettenstrom | |
| 2019/0110464 | A1 | 4/2019 | Wynalda | |
| 2019/0369127 | A1 | 12/2019 | Fu et al. | |
| 2020/0060337 | A1 | 2/2020 | Liu et al. | |
| 2020/0146353 | A1 | 5/2020 | Liu et al. | |
| 2020/0352246 | A1 | 11/2020 | Yamada et al. | |
| 2020/0375262 | A1 | 12/2020 | Aboabdo | |

FOREIGN PATENT DOCUMENTS

| | | | |
|---|---|---|---|
| CN | 206714086 | U | 12/2017 |
| CN | 208079036 | U | 11/2018 |
| CN | 110742323 | A | 2/2020 |
| CN | 111438026 | A | 7/2020 |
| EP | 3510880 | A1 | 7/2019 |
| JP | S63-197836 | A | 8/1988 |
| JP | 2010-091271 | A | 4/2010 |
| JP | 2012-213472 | A | 11/2012 |
| JP | 2016-536997 | A | 12/2016 |
| JP | 2020-037085 | A | 3/2020 |
| KR | 10-2016-0102293 | A | 8/2016 |
| KR | 10-2018-0107161 | A | 10/2018 |
| KR | 10-2018-0117654 | A | 10/2018 |
| KR | 10-2020-0098679 | A | 8/2020 |
| WO | 2020/243335 | A1 | 12/2020 |

OTHER PUBLICATIONS

English machine translation of CN 202539014 U; Song et al.; Nov. 21, 2012; 13 pages. (Year: 2012).*

Extended European Search Report dated Jun. 13, 2023 in European Application No. 22743437.0.

Korean Office Action dated Jun. 19, 2023 in Korean Application No. 10-2021-0051353.

Canadian Office Action dated Nov. 10, 2023 in Canadian Application No. 3,169,826.

Russian Office Action dated Dec. 22, 2023 in Russian Application No. 2022121619/28.

First Office Action issued in Chinese Application No. 202280002584.9 dated Jun. 17, 2024 (18 Pages).

Office Action issued Dec. 15, 2022 in Korean Application No. 10-2021-0051353.

International Search Report for PCT/KR2022/002709 dated Jun. 9, 2022 [PCT/ISA/210].

* cited by examiner

[Fig. 1]
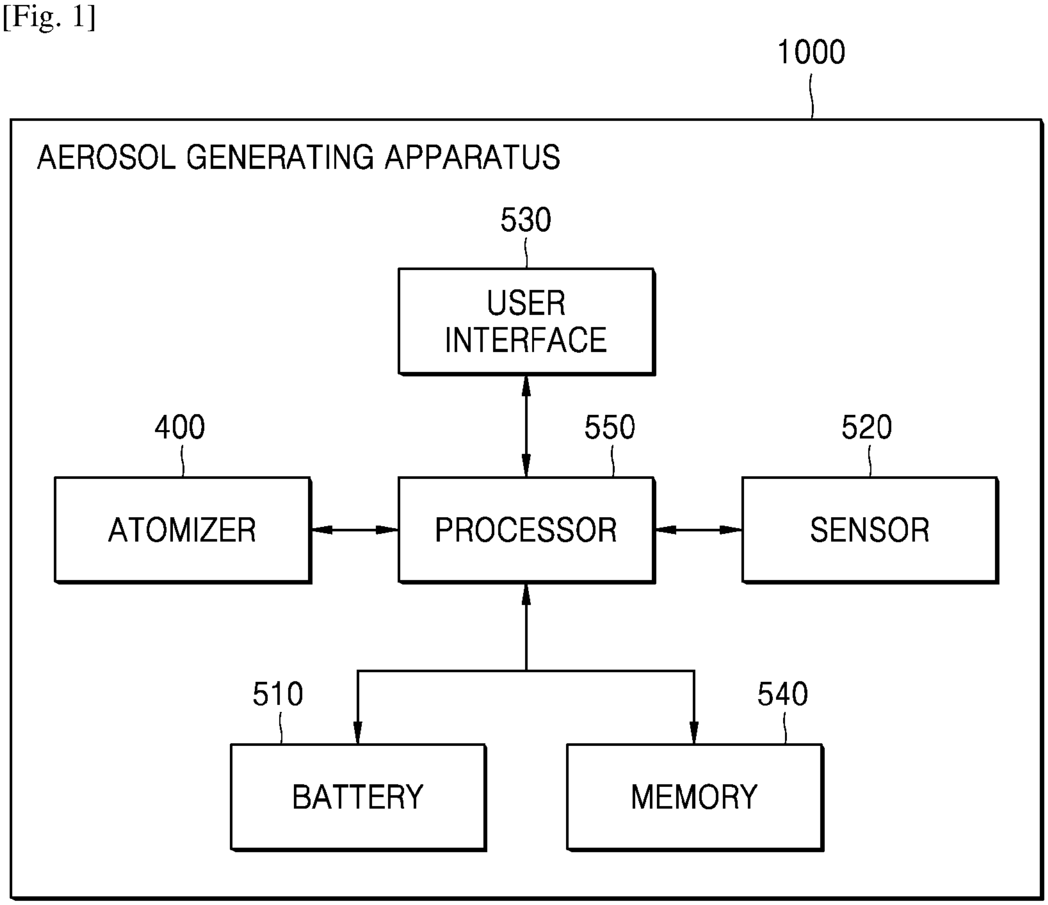

[Fig. 2]
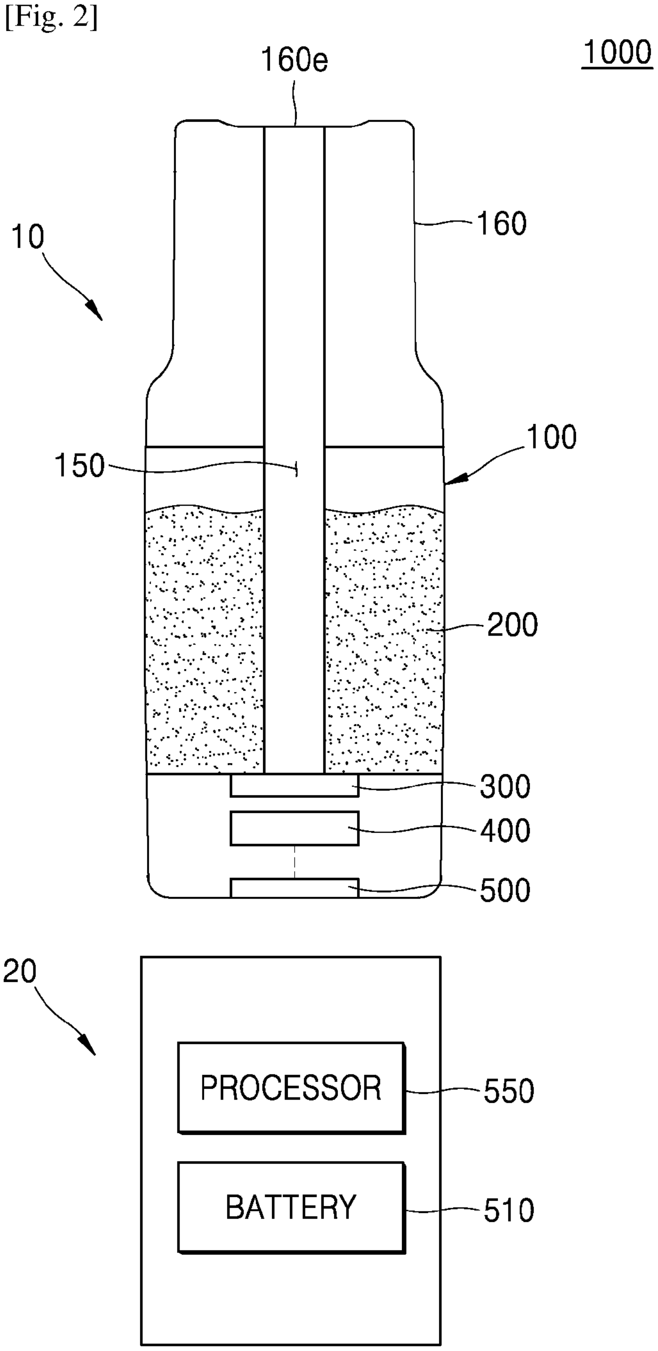

[Fig. 3]
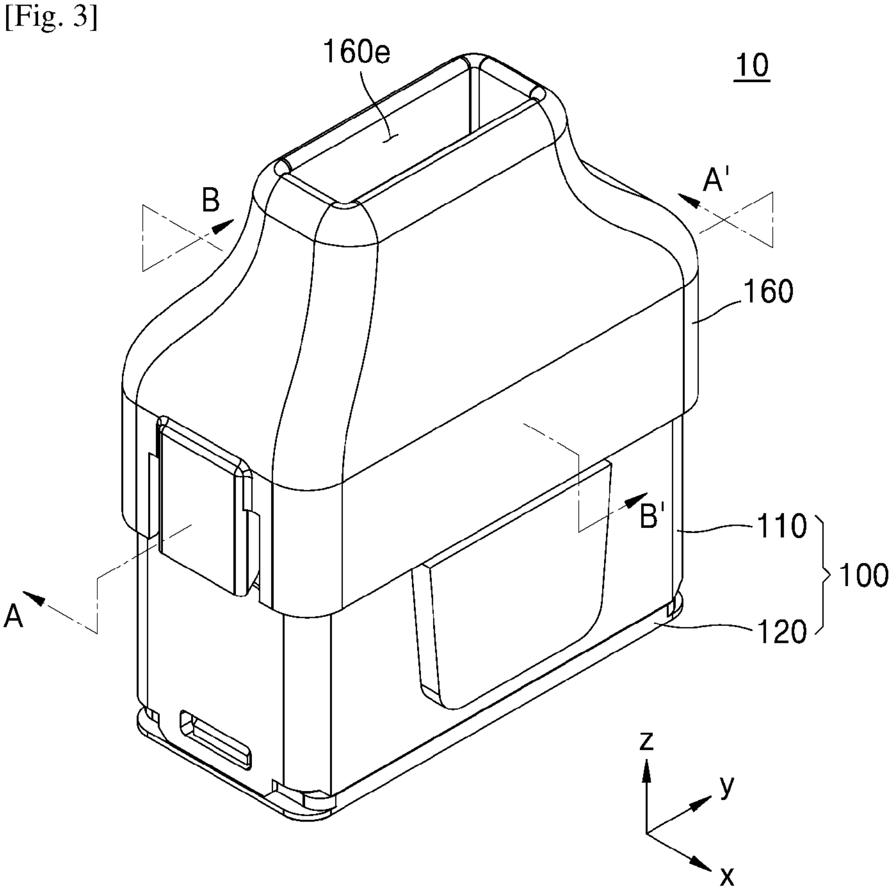

[Fig. 4]
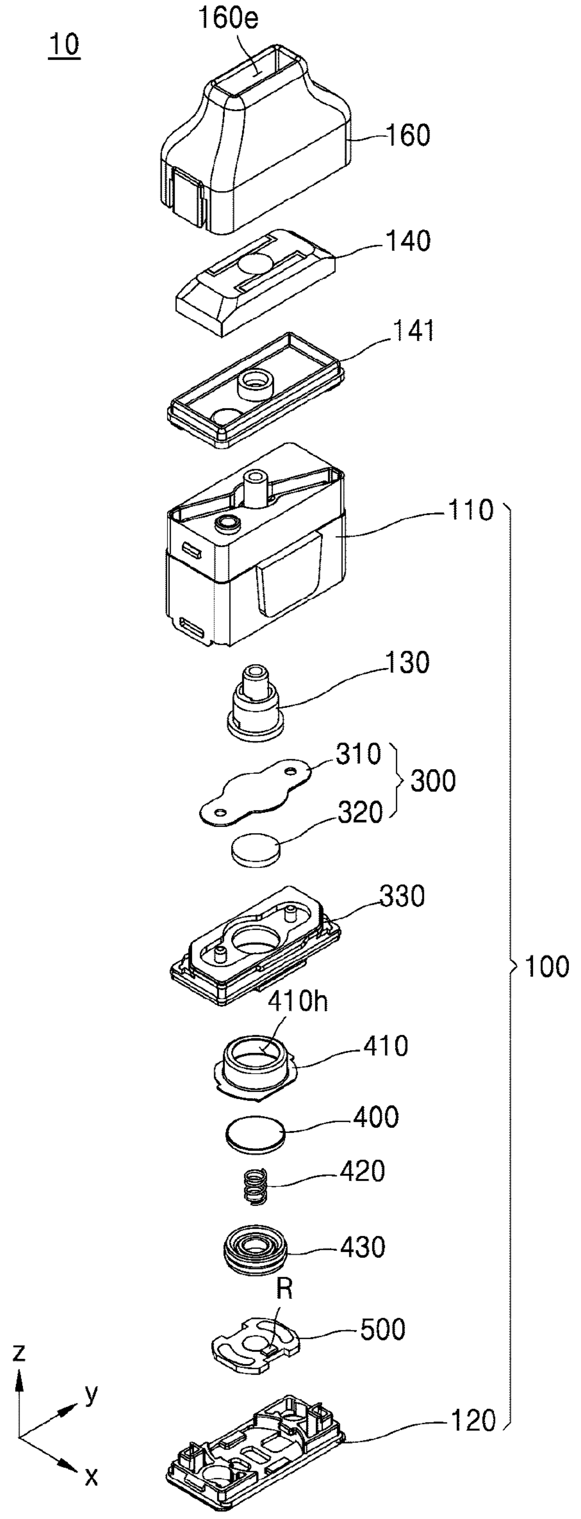

[Fig. 5]
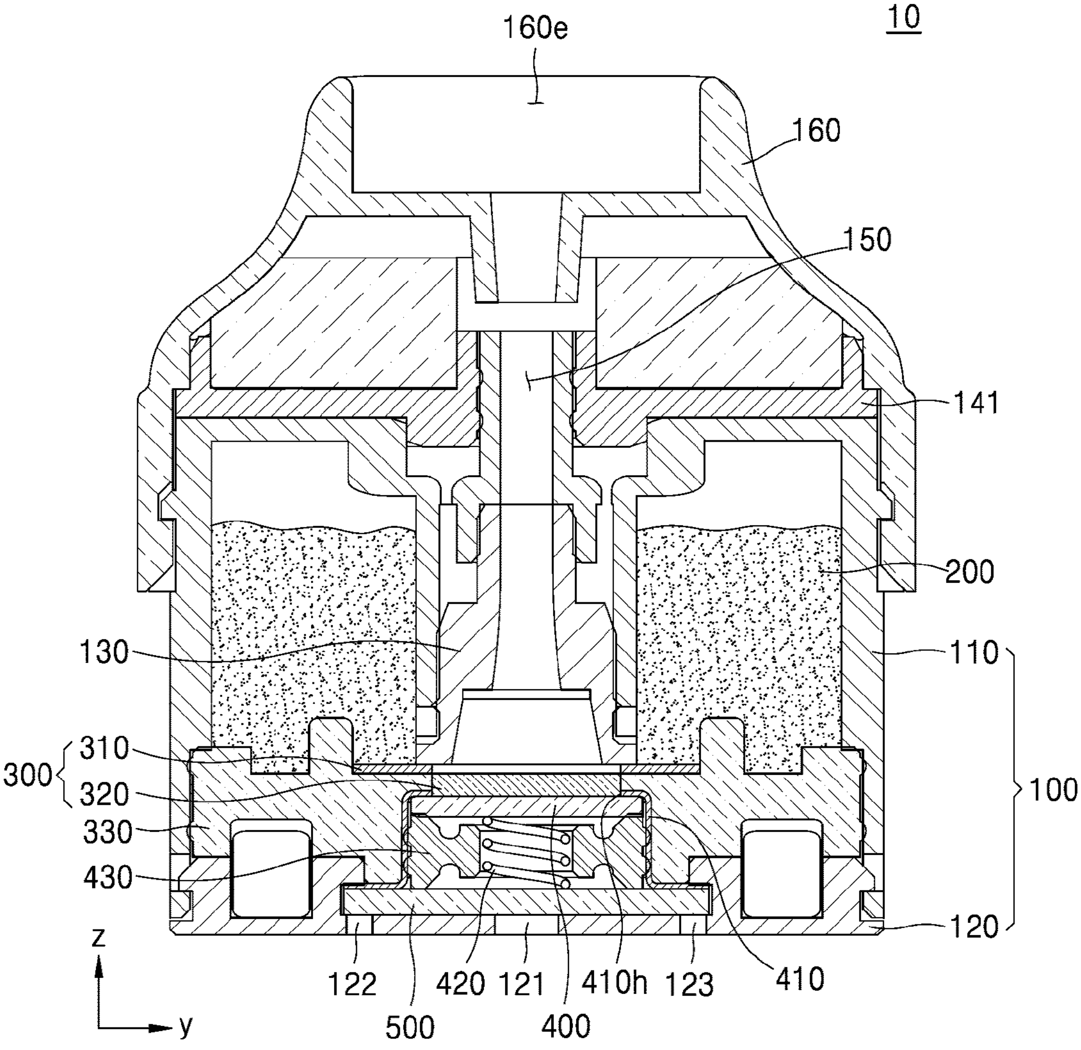

[Fig. 6]
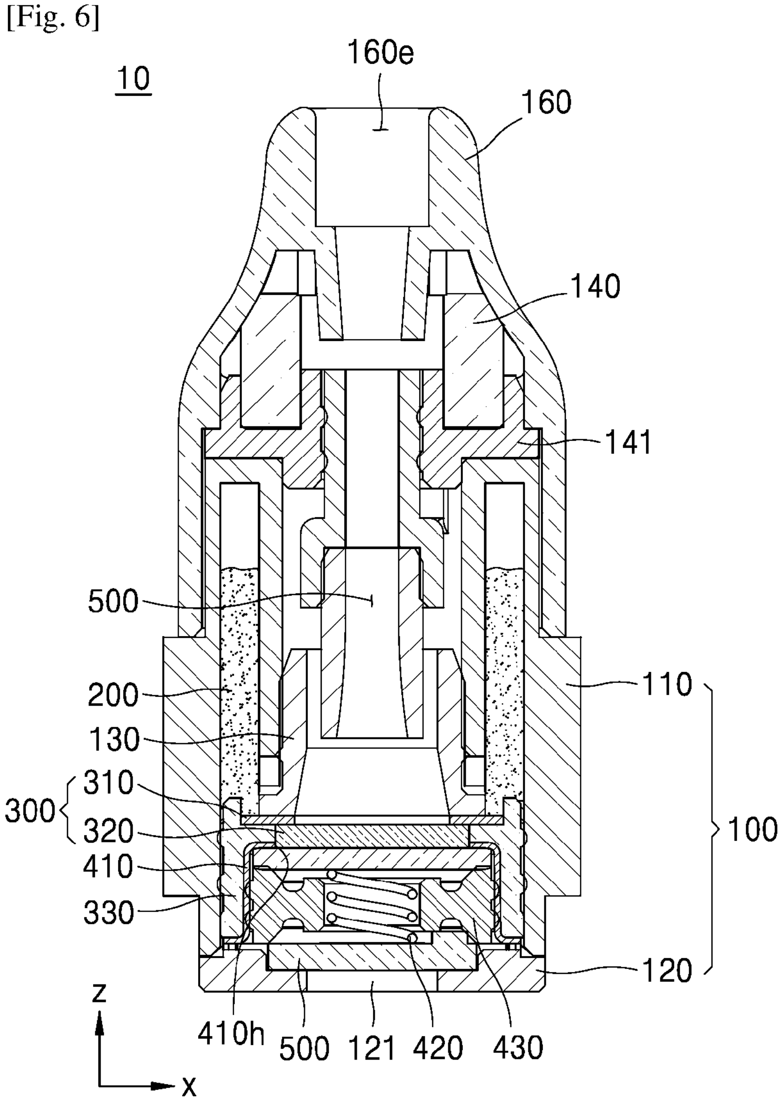

[Fig. 7]
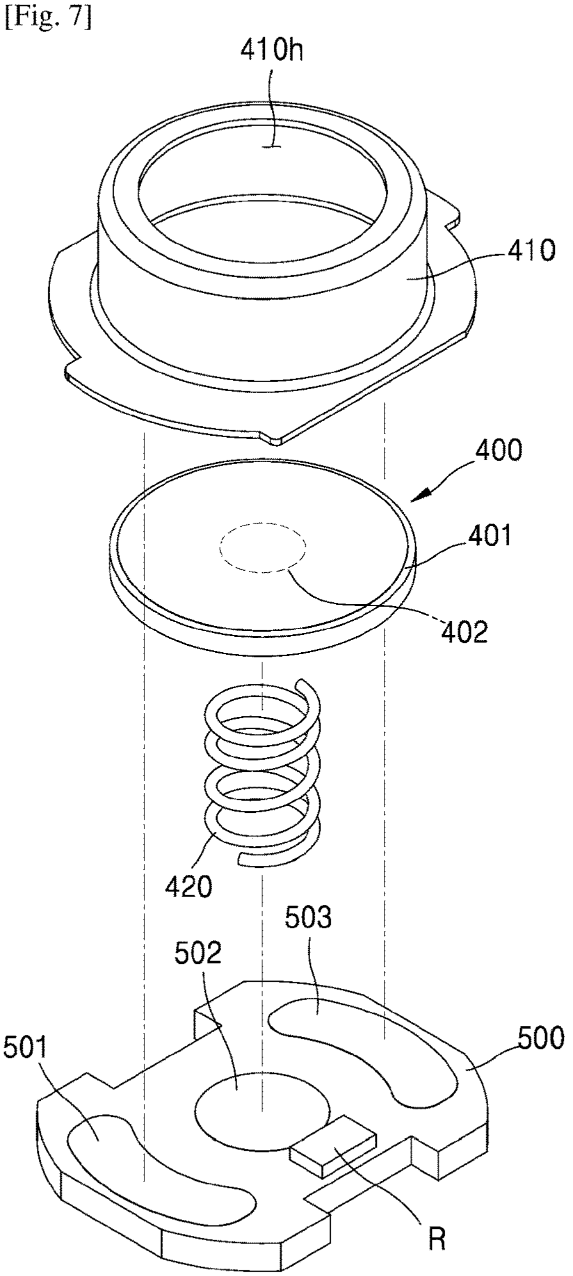
[Fig. 8]
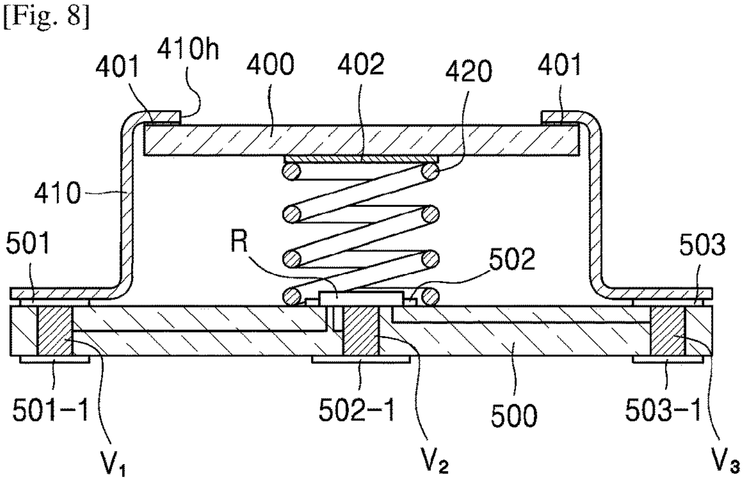

[Fig. 9]
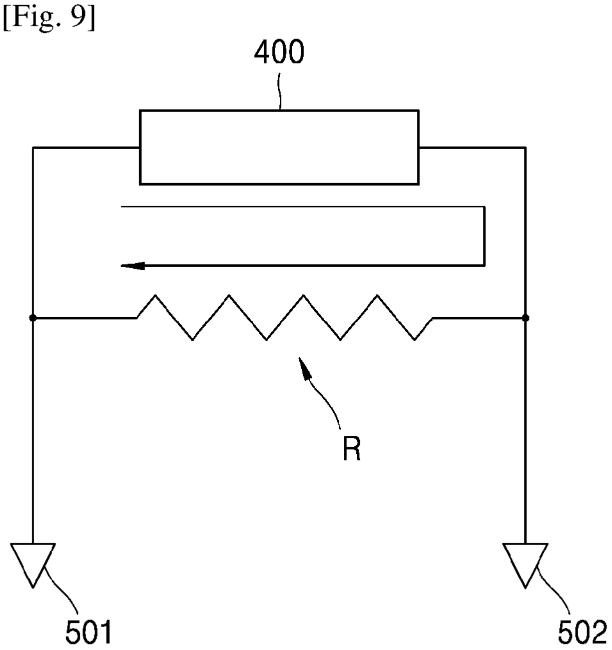
[Fig. 10]
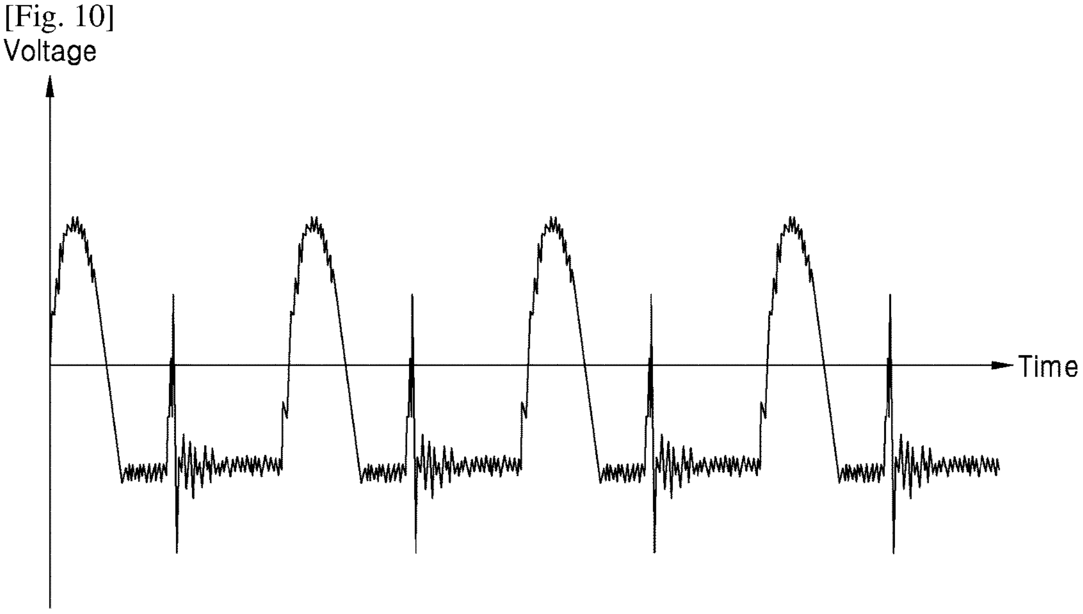

CARTRIDGE AND AEROSOL GENERATING APPARATUS COMPRISING THE SAME

TECHNICAL FIELD

One or more embodiments relate to a cartridge and an aerosol generating apparatus including the same, more particularly, to a cartridge including a printed circuit board in which a resistor for filtering noise occurring during the application of a voltage to a vibrator is arranged, and an aerosol generating apparatus including the cartridge.

BACKGROUND ART

In recent years, there has been an increasing demand for technology to replace a method of supplying an aerosol by burning a general cigarette, with another method. For example, research has been conducted to supply an aerosol having flavor by generating an aerosol from an aerosol generating material in a liquid or solid state or generating a vapor from an aerosol generating material in a liquid state, and then by passing the generated vapor through a solid fragrance medium.

DISCLOSURE

Technical Problem

Generally, an aerosol generating apparatus uses a heater to heat an aerosol generating material in a liquid or solid state to generate aerosols. To supply aerosols with excellent taste to a user, it is important to heat the aerosol generating material to an appropriate temperature. However, in an aerosol generating apparatus using a heater, the aerosol generating material is sometimes unintentionally heated to a high temperature, thereby causing a situation in which the user feels a burnt taste during the smoking process.

To solve the problem of the aerosol generating apparatus using the heater, an aerosol generating apparatus capable of generating aerosols by using ultrasonic vibration has been proposed. The aerosol generating apparatus using ultrasonic vibration may reduce viscosity of a liquid aerosol generating material through heat generated when an alternating voltage is applied to the vibrator, and may generate aerosols by making the aerosol generating material into fine particles through ultrasonic vibration generated by the vibrator.

The aerosol generating apparatus using ultrasonic vibration is advantageous in that aerosols may be generated while maintaining the aerosol generating material at a lower temperature (e.g., about 100° C. to about 160° C.) compared to the heater, but the vibrator may be damaged due to noise that occurs during the application of an alternating voltage to the vibrator.

For example, if a higher voltage than the intended voltage is applied to the vibrator due to noise included in a voltage signal applied to the vibrator, the temperature of the vibrator may rise above the Curie temperature, and as a result, the vibrator may be damaged and the generation of aerosols may not be performed smoothly.

To resolve the problems described above, the present disclosure provides a cartridge including a printed circuit board on which a resistor is mounted to filter the noise that occurs during the application of a voltage to the vibrator, and an aerosol generating apparatus including the cartridge.

The technical problems of the present disclosure are not limited to the above-described description, and other technical problems may be derived from the embodiments to be described hereinafter.

Technical Solution

According to an embodiment, a cartridge includes a housing, a reservoir located in the housing and storing an aerosol generating material, an atomizer located in the housing and configured to generate vibration to atomize the aerosol generating material to an aerosol, a liquid delivery element configured to absorb the aerosol generating material stored in the reservoir and deliver the absorbed aerosol generating material to the atomizer, and a resistor located in the housing and configured to eliminate noise in a signal applied to the atomizer.

According to an embodiment, an aerosol generating apparatus may include the cartridge, a main body connected to the cartridge, a battery arranged in the main body and configured to supply power to the atomizer of the cartridge, and a processor arranged in the main body and configured to control the power supplied to the cartridge through the battery.

Advantageous Effects

According to one or more embodiments, a cartridge and an aerosol generating apparatus including the same may, by making an aerosol generating material into fine particles by using a vibrator that generates ultrasonic vibration, generate aerosols at a relatively low temperature compared to when a heater is used, and as a result, may improve smoking sensation of a user.

In addition, the cartridge and the aerosol generating apparatus including the same according to one or more embodiments may, by removing noise that occurs during the application of voltage to the vibrator, prevent damage to the vibrator, and as a result, enable a stable operation of the cartridge and the aerosol generating apparatus.

The effects according to one or more embodiments are not limited to the effects described above, and unmentioned effects will be clearly understood by one of ordinary skill in the art from the present specification and the accompanying drawings.

DESCRIPTION OF DRAWINGS

FIG. 1 is a block diagram of an aerosol generating apparatus according to an embodiment;

FIG. 2 is a view schematically illustrating an aerosol generating apparatus illustrated in FIG. 1;

FIG. 3 is a perspective view of a cartridge according to an embodiment;

FIG. 4 is an exploded perspective view of a cartridge according to an embodiment;

FIG. 5 is a cross-sectional view of the cartridge shown in FIG. 3 along an A-A' direction;

FIG. 6 is a cross-sectional view of the cartridge shown in FIG. 3 along a B-B' direction;

FIG. 7 is an exploded perspective view illustrating an electrical connection between a vibrator and a printed circuit board of the cartridge;

FIG. 8 is a cross-sectional view of an electrical connection between the vibrator and the printed circuit board of the cartridge show in FIG. 7;

FIG. 9 is a circuit diagram showing an electrical connection between the vibrator of the cartridge and a resistor mounted on the printed circuit board shown in FIG. 7; and FIG. 10 is a graph showing a change in voltage applied to the vibrator of the cartridge, according to an embodiment.

MODE FOR INVENTION

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The term "aerosol" described in the specification means a gas in a state in which vaporized particles generated from aerosol generating material and air are mixed.

In addition, the term "aerosol generating device" described in the specification means device that generates the aerosol by using the aerosol generating material such that the aerosol can be inhaled directly into a user's lungs through the user's mouth.

The term "puff" described in the specification means inhalation by the user, and inhalation means a situation in which the aerosol is drawn into the user's mouth, nasal cavity, or lungs through the user's mouth or nose.

Hereinafter, the present disclosure will now be described more fully with reference to the accompanying drawings, in which exemplary embodiments of the present disclosure are shown such that one of ordinary skill in the art may easily work the present disclosure.

FIG. 1 is a block diagram of an aerosol generating device according to an embodiment.

Referring to FIG. 1, the aerosol generating device 1000 may include an atomizer 400, a battery 510, a sensor 520, a user interface 530, a memory 540 and a processor 550. However, the internal structure of the aerosol generating device 1000 is not limited to the structures illustrated in FIG. 1. According to the design of the aerosol generating device 1000, it will be understood by one of ordinary skill in the art that some of the components shown in FIG. 1 may be omitted or new components may be added.

In an embodiment, the aerosol generating device 1000 may consist of only a main body, in which case components included in the aerosol generating device 1000 are located in the main body.

In another embodiment, the aerosol generating device 1000 may consist of a main body and a cartridge, in which case components included in the aerosol generating device 1000 are located separately in the main body and the cartridge. Alternatively, at least some of components included in the aerosol generating device 1000 may be located respectively in the main body and the cartridge.

Hereinafter, an operation of each of the components will be described without being limited to the location in a particular space in the aerosol generating device 1000.

The atomizer 400 receives power from the battery 510 under the control of the processor 550. The atomizer 400 receives power from the battery 510 under the control of the processor 550 The atomizer 400 may receive power from the battery 510 and atomize the aerosol generating material stored in the aerosol generating device 1000.

The atomizer 400 may be located in the main body of the aerosol generating device 1000. Alternatively, when the aerosol generating device 1000 consists of the main body and the cartridge, the atomizer 400 may be located in the cartridge. When the atomizer 400 is located in the cartridge, the atomizer 400 may receive power from the battery 510 located in at least one of the main body and the cartridge. In addition, when the atomizer 400 is located separately in the main body and the cartridge, components requiring power supply in the atomizer 400 may receive power from battery 510 located in at least one of the main body and the cartridge.

The atomizer 400 generate aerosol from the aerosol generating material inside the cartridge. The aerosol may refer to a gas in which vaporized particles generated from the aerosol generating material are mixed with air. Therefore, the aerosol generated from the atomizer 400 means a gas in which vaporized particles generated from the aerosol generating material are mixed with air. For example, the atomizer 400 performs a function of generating aerosol by converting the phase of the aerosol generating material inside the cartridge 20 to a gaseous phase. In addition, the atomizer 400 generates an aerosol by discharging the aerosol generating material in a liquid and/or solid phase into fine particles.

For example, the atomizer 400 generates the aerosol from the aerosol generating material by using an ultrasonic vibration method. The ultrasonic vibration method means a method of generating the aerosol by atomizing the aerosol generating material with ultrasonic vibration generated by a vibrator.

Although not shown in FIG. 1, the atomizer 400 may optionally include a heater capable of heating the aerosol generating material by generating heating. The aerosol generating material may be heated by the heater, such that the aerosol may be generated.

The heater may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater may be implemented by a metal wire, a metal plate on which an electrically conductive track is arranged, or a ceramic heating element, but is not limited thereto.

In an embodiment, the heater may be a component included in the cartridge. The cartridge may include the heater 130, the liquid delivery element, and the liquid storage. The aerosol generating material accommodated in the liquid storage may be moved to the liquid delivery element, and the heater may heat the aerosol generating material absorbed by the liquid delivery element, thereby generating aerosol. For example, the heater may include a material such as nickel chromium and may be wound around or arranged adjacent to the liquid delivery element.

In another embodiment, the aerosol generating device 1000 may include an accommodation space accommodating the aerosol generating article. The heater 130 may heat the aerosol generating article inserted into the accommodation space of the aerosol generating device 1000. As the aerosol generating article is accommodated in the accommodation space of the aerosol generating device 1000, the heater may be located inside and/or outside the aerosol generating article. Accordingly, the heater may generate aerosol by heating the aerosol generating material in the aerosol generating article.

Meanwhile, the heater may include an induction heater. The heater may include an electrically conductive coil for heating an aerosol generating article in an induction heating method, and the aerosol generating article or the cartridge may include a susceptor which may be heated by the induction heater.

The battery 510 supplies power to be used for the aerosol generating device 1000 to operate. In other words, the battery 510 may supply power such that the heater may be heated. In addition, the battery 510 may supply power required for operation of other components included in the aerosol generating device 1000, that is, the sensor 520, the user interface 530, the memory 540, and the processor 550. The battery 510 may be a rechargeable battery or a disposable battery.

For example, the battery 510 is a lithium-ion battery, a nickel-based battery (for example, a nickel-metal hydride battery, a nickel-cadmium battery), or a lithium-based battery (for example, a lithium-cobalt battery, a lithium-Phosphate battery, lithium titanate battery or lithium-polymer battery). However, the type of the battery 510 can be used in the aerosol generating device 100 is not limited by the above description. If necessary, the battery 510 may include an alkaline battery or a manganese battery.

The aerosol generating device 1000 may include at least one sensor 520. A result sensed by the at least one sensor 520 is transmitted to the processor 550, and the processor 550 may control the aerosol generating device 1000 to perform various functions such as controlling the operation of the heater, restricting smoking, determining whether an aerosol generating article (or a cartridge) is inserted, and displaying a notification.

For example, at least one sensor 520 may include a puff sensor. The puff sensor may detect a user's puff based on any one of a temperature change, a flow change, a voltage change, and a pressure change. The puff sensor may detect a start timing and an end timing of the user's puff, and the processor 550 may determine a puff period and a non-puff period according to the detected start timing and end timing of the puff.

In addition, at least one sensor 520 may include a user input sensor. The user input sensor may be a sensor capable of receiving a user's input, such as a switch, a physical button, or a touch sensor. For example, the touch sensor may be a capacitive sensor capable of detecting a user's input by detecting a change in capacitance when the user touches a predetermined area formed of a metal material. The process 550 may determine whether a user's input has occurred by comparing values before and after a change in capacitance received from the capacitive sensor. When the value before and after the change of capacitance exceeds the preset threshold, the processor 550 may determine that the user's input has occurred.

In addition, at least one sensor 520 may include a motion sensor. Through the motion sensor, information on the movement of the aerosol generating apparatus 1000, such as the tilt, movement speed, and acceleration of the aerosol generating apparatus 1000 may be obtained. For example, the motion sensor may determine whether the aerosol generating apparatus 1000 is moving, whether the aerosol generating apparatus 1000 is inclined at an angle within a certain range for puffing, and whether the aerosol generating apparatus 1000 is inclined, between puffing actions, at an angle different from the angle during the puffing action. The motion sensor may measure movement information of the aerosol generating apparatus 1000 using various methods known in the art. For example, the motion sensor may include an acceleration sensor for measuring accelerations in three directions, which are X-axis, Y-axis, and Z-axis directions, and a gyro sensor for measuring angular velocity in three directions.

In addition, at least one sensor 520 may include a proximity sensor. The proximity sensor may detect an approaching object or presence of an object in the vicinity, or a distance to the object by using an electromagnetic force, infrared rays, or the like without mechanical contact, thereby detecting whether the user accesses the aerosol generating apparatus 1000.

In addition, at least one sensor 520 may include an image sensor. The image sensor may include, for example, a camera for acquiring an image of the object. The image sensor may recognize an object on the basis of the image acquired by the camera. The processor 550 may analyze the image obtained through the image sensor to determine whether the user is about to use the aerosol generating apparatus 1000. For example, when the user brings the aerosol generating apparatus 1000 near the lips to use the aerosol generating apparatus 1000, the image sensor may obtain an image of the lips. In this case, the processor 550 may analyze the image and determine that the user is about to use the aerosol generating apparatus 1000. Accordingly, the aerosol generating apparatus 1000 may operate the atomizer in advance, or preheat the heater.

In addition, at least one sensor 520 may include a consumable detachment sensor capable of detecting mounting or removal of consumables (e.g., cartridges, cigarettes, etc.) for the aerosol generating apparatus 1000. For example, the consumable detachment sensor may detect whether the consumables are in contact with the aerosol generating apparatus 1000, or may determine whether the consumables are detached based on an image obtained by the image sensor. In addition, the consumable detachment sensor may also be an inductance sensor that detects a change in an inductance value of the coil that may interact with a marker of the consumable, or a capacitance sensor that detects a change in a capacitance value of a capacitor that may interact with the marker of the consumable.

In addition, at least one sensor 520 may include a temperature sensor. The temperature sensor may detect a temperature at which the heater (or the aerosol generating material) of the atomizer 400 is heated. The aerosol generating apparatus 1000 may include a separate temperature sensor for sensing a temperature of the heater, or the heater itself may serve as a temperature sensor instead of separately including the temperature sensor. Alternatively, the heater may serve as a temperature sensor and, at the same time, the aerosol generating apparatus 1000 may further include a separate temperature sensor. In addition, the temperature sensor may detect the temperatures of internal components such as a printed circuit board, the battery, etc. of the aerosol generating apparatus 1000, in addition to the heater.

In addition, at least one sensor 520 may include various sensors for measuring information of the surrounding environment of the aerosol generating apparatus 1000. For example, at least one sensor 520 may include a temperature sensor capable of measuring the temperature of the surrounding environment, a humidity sensor for measuring the humidity of the surrounding environment, and an atmospheric pressure sensor for measuring the pressure of the surrounding environment.

The sensor 520 that may be provided in the aerosol generating apparatus 1000 is not limited to the types described above, and may further include various sensors. For example, the aerosol generating apparatus 1000 may include a fingerprint sensor for obtaining fingerprint information from the finger of the user for user authentication and security, an iris recognition sensor for analyzing an iris pattern of a pupil, a vein recognition sensor for detecting the amount of infrared absorption of reduced hemoglobin in veins from images of a palm, a facial recognition sensor that recognizes feature points such as eyes, nose, mouth and facial contours in a 2D or 3D method, and a radio-frequency identification sensor (RFID).

The aerosol generating apparatus 1000 may selectively include only some of the various sensors 520 exemplified above. In other words, the aerosol generating apparatus 1000 may combine and utilize information sensed by at least one sensor of the sensors described above.

The user interface 530 may provide the user with information about the state of the aerosol generating device 1000. The user interface 530 may include various interfacing devices, such as a display or a light emitter for outputting visual information, a motor for outputting haptic information, a speaker for outputting sound information, input/output (I/O) interfacing devices (e.g., a button or a touch screen) for receiving information input from the user or outputting information to the user, terminals for performing data communication or receiving charging power, and communication interfacing modules for performing wireless communication (e.g., Wi-Fi, Wi-Fi direct, Bluetooth, near-field communication (NFC), etc.) with external devices.

However, the aerosol generating device 1000 may be implemented by selecting only some of the above-described examples of various user interface 530.

The memory 540, as a hardware component configured to store various pieces of data processed in the aerosol generating device 1000, may store data processed or to be processed by the processor 550. The memory 540 may include various types of memories; random access memory (RAM), such as dynamic random access memory (DRAM) and static random access memory (SRAM), etc.; read-only memory (ROM); electrically erasable programmable read-only memory (EEPROM), etc.

The memory 540 may store an operation time of the aerosol generating device 1000, the maximum number of puffs, the current number of puffs, at least one temperature profile, data on a user's smoking pattern, etc.

The processor 550 may generally control operations of the aerosol generating device 1000. The processor 550 can be implemented as an array of a plurality of logic gates or can be implemented as a combination of a general-purpose microprocessor and a memory in which a program executable in the microprocessor is stored. It will be understood by one of ordinary skill in the art that the processor 550 can be implemented in other forms of hardware.

The processor 550 analyzes a result of the sensing by at least one sensor 520, and controls the processes that are to be performed subsequently.

The processor 550 may control power supplied to the atomizer 400 so that the operation of the atomizer 400 is started or terminated, based on the result of the sensing by the at least one sensor 520. In addition, based on the result of the sensing by the at least one sensor 520, the processor 550 may control the amount of power supplied to the atomizer 400 and the time at which the power is supplied, so that the atomizer 400 is heated to a predetermined temperature or maintained at an appropriate temperature. For example, the processor 550 may control the current or voltage supplied to the vibrator so that the vibrator of the atomizer 400 may vibrate at a certain frequency.

In an embodiment, the processor 550 may start the operation of the atomizer 400 after receiving a user input to the aerosol generating device 1000. In addition, the processor 550 may start the operation of the atomizer after detecting a user's puff by using the puff sensor. In addition, the processor 550 may stop supplying power to the atomizer 400 when the number of puffs reaches a preset number after counting the number of puffs by using the puff sensor.

The processor 550 may control the user interface 530 based on the result of the sensing by the at least one sensor 520. For example, when the number of puffs reaches the preset number after counting the number of puffs by using the puff sensor, the processor 550 may notify the user by using at least one of a light emitter, a motor, or a speaker that the aerosol generating device 1000 will soon be terminated.

Although not illustrated in FIG. 1, the aerosol generating device 1000 may form an aerosol generating system together with an additional cradle. For example, the cradle may be used to charge the battery 510 of the aerosol generating device 1000. For example, while the aerosol generating device 1000 is accommodated in an accommodation space of the cradle, the aerosol generating device 1000 may receive power from a battery of the cradle such that the battery 510 of the aerosol generating device 1000 may be charged.

FIG. 2 is a view schematically illustrating an aerosol generating apparatus according to an embodiment.

At least one of the components of the aerosol generating apparatus 1000 shown in FIG. 2 may be the same as or similar to at least one of the components of the aerosol generating apparatus 1000 shown in FIG. 1, and thus redundant descriptions will be omitted.

Referring to FIG. 2, the aerosol generating apparatus 1000 includes a cartridge 10 for storing the aerosol generating material and a main body 20 that supports the cartridge 10.

*77 The cartridge 10 may be coupled to the main body 20 in a state of accommodating an aerosol generating material therein. For example, the cartridge 10 may be coupled to the main body 20 by at least a portion of the cartridge 10 being inserted into the main body 20. As another example, the cartridge 10 may be coupled to the main body 20 by at least a portion of the main body 20 being into the cartridge 10.

The cartridge 10 and the main body 20 may be coupled to each other by at least one of a snap-fit method, a screw connection method, a magnetic force coupling method, or an interference fit method, but a method of coupling the cartridge 10 and the main body 20 is not limited to the examples described above.

According to an embodiment, the cartridge 10 may include a housing 100, a mouthpiece 160, a reservoir 200, a liquid delivery element 300, the atomizer 400, and a printed circuit board 500.

The housing 100 may form an overall outer shape of the cartridge 10 together with the mouthpiece 160, and the components for the operation of the cartridge 10 may be arranged in the housing 100. In an embodiment, the housing 100 may be formed in a rectangular shape, but the shape of the housing 100 is not limited to the embodiment described above. According to an embodiment, the housing 100 may be formed in a polygonal column (e.g., a triangular column, a pentagon column) shape or a cylindrical shape.

The mouthpiece 160 is arranged at the housing 100, and may include an outlet 160*e* for discharging the aerosol generated from the aerosol generating material to the outside. In one embodiment, the mouthpiece 160 may be disposed at a portion of the cartridge 10, and the opposite portion of the cartridge 10 may be coupled to the main body 20. The user may be provided with aerosol from the cartridge 10 by contacting the mouth with the mouthpiece 160 and inhaling.

Through the inhalation or puffing actions of the user, a difference in pressure may occur between the outside of the cartridge 10 and the inside of the cartridge 10. Accordingly, an aerosol generated from the inside of the cartridge 10 may be discharged to the outside of the cartridge 10 through the outlet 160*e*. In this way, the user may be provided with aerosol discharged to the outside of the cartridge 10 through the outlet 160*e* by contacting the mouth with the mouthpiece 160 and inhaling.

The reservoir 200 may be located in an inner space of the housing 100 and may accommodate the aerosol generating material. In the present disclosure, the expression "the reservoir accommodates the aerosol generating material" means that the reservoir 200 may simply serve as a container for directly storing the aerosol generating material, or include an element impregnated with (containing) an aerosol generating material, such as a sponge, cotton, fabric, or porous ceramic structure.

The reservoir 200 may accommodate an aerosol generating material having any one state of, for example, a liquid, solid, gas, gel, or the like.

In an embodiment, the aerosol generating material may include a liquid composition. The liquid composition may be a liquid including a tobacco-containing material having a volatile tobacco flavor component, or a liquid including a non-tobacco material.

The liquid composition may include, for example, any one component of water, solvents, ethanol, plant extracts, spices, flavorings, and vitamin mixtures, or a mixture thereof. The spices may include menthol, peppermint, spearmint oil, and various fruit-flavored ingredients, but are not limited thereto.

The flavorings may include ingredients capable of providing various flavors or tastes to a user. Vitamin mixtures may be a mixture of at least one of vitamin A, vitamin B, vitamin C, and vitamin E, but are not limited thereto. In addition, the liquid composition may include an aerosol forming agent such as glycerin and propylene glycol.

For example, the liquid composition may have any weight ratio between glycerin and propylene glycol solution to which nicotine salts are added. The liquid composition may include two or more types of nicotine salts. Nicotine salts may be formed by adding suitable acids, including organic or inorganic acids, to nicotine. Nicotine may be a naturally generated nicotine or synthetic nicotine and may have any suitable weight concentration relative to the total solution weight of the liquid composition.

Acid for forming nicotine salts may be appropriately selected in consideration of the rate of nicotine absorption in the blood, operating temperature of the aerosol generating apparatus 1000, the flavor or savor, the solubility, or the like. For example, the acid for the formation of nicotine salts may be a single acid selected from the group consisting of benzoic acid, lactic acid, salicylic acid, lauric acid, sorbic acid, levulinic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid or malic acid, or a mixture of two or more acids selected from the group, but is not limited thereto.

The atomizer 400 may be located inside the housing 100 and may convert a phase of the aerosol generating material stored in the cartridge 10 to generate aerosol.

For example, the aerosol generating material stored or accommodated in the reservoir 200 may be supplied from the reservoir 200 to the atomizer 400 through the liquid delivery element 300, and the atomizer 400 may generate aerosols by atomizing the aerosol generating material received from the liquid delivery element 300. At this time, the liquid delivery element 300 may be a wick including at least one of cotton fiber, ceramic fiber, glass fiber, and porous ceramic, but the liquid delivery element 300 is limited to the embodiments described above.

According to one embodiment, the atomizer 400 of the aerosol generating apparatus 1000 may convert the phase of the aerosol generating material by using an ultrasonic vibration method that atomizes the aerosol generating material with ultrasonic vibration.

For example, the atomizer 400 may include a vibrator that generates vibrations having a short period. For example, the vibrations generated from the vibrator may be ultrasonic vibrations. The frequency of the ultrasonic vibrations may be about 100 kHz to about 3.5 MHz, but is not limited thereto.

The aerosol generating material supplied to the atomizer 400 from the reservoir 200 by short periods of vibrations generated from the vibrator may be vaporized and/or changed to particles and atomized to an aerosol.

The vibrator may include, for example, a piezoelectric ceramic, and the piezoelectric ceramic may, by generating electricity (voltage) by a physical force (pressure), and generating vibration (mechanical force) when electricity is applied thereto, act as a functional material capable of converting electrical force into mechanical force and vice versa. That is, as electricity is applied to the vibrator, vibrations (physical force) of short periods may be generated, and the generated vibrations break down the aerosol generating material to small particles to thereby atomize to an aerosol.

The vibrator may be electrically connected to other components of the aerosol generating apparatus 1000 through an electrical connection member.

According to an embodiment, the vibrator may be electrically connected with at least one of a battery 510 (e.g., the battery 510 of FIG. 1), a processor 550 (e.g., the processor 550 of FIG. 1), and a driving circuit of the aerosol generating apparatus 1000 through a printed circuit board 500 located inside the housing 100 of the cartridge 10. For example, the vibrator may be electrically connected to the printed circuit board 500 located inside the cartridge 10 through the first electrical connection member, and the printed circuit board 500 may be electrically connected to the battery 510, processor 550, and/or other driving circuits of the main body 20 through the second electrical connection member. That is, the vibrator may be electrically connected to the components of the main body 20 via the printed circuit board 500.

According to another embodiment (not shown), the vibrator may be directly connected to at least one of the battery 510 and the processor 550 of the main body 20 and the driving circuit of the aerosol generating apparatus 1000, without the printed circuit board 500 as a medium for connection.

The vibrator may generate ultrasonic vibration by receiving currents or voltages from the battery 510 of the main body 20 through the electrical connection member. In addition, the vibrator may be electrically connected to the processor 550 of the main body 20 through the electrical connection member, and the processor 550 may control the operation of the vibrator.

The electrical connection member may include, for example, a pogo pin, a wire, a cable, a flexible printed circuit board (FPCB), or a C-clip, but the electrical connection member is not limited to the examples described above.

In another embodiment (not shown), the atomizer 400 may be implemented with receiving portion in a mesh shape or plate shape, which absorbs the aerosol generating material without a separate liquid delivery element 300, maintains the aerosol generating material in an optimal state for conversion to an aerosol, and transmits vibration to the aerosol generating material such that an aerosol is generated.

The aerosol generated by the atomizer 400 may be discharged to the outside of the cartridge 10 through a discharge passage 150 and supplied to the user.

According to an embodiment, the discharge passage 150 may be located inside the cartridge 10 and may be connected to or communicate with the atomizer 400 and the outlet 160*e* of the mouthpiece 160. Accordingly, the aerosol generated in the atomizer 400 may flow along the discharge passage 150 and may be discharged to the outside of the cartridge 10 or the aerosol generating apparatus 1000 through the outlet 160*e*. The user may be supplied with the aerosol by contacting the mouth with the mouthpiece 160 and inhaling the aerosol being discharged from the discharge outlet 160*e*.

For example, the discharge passage 150 may be arranged such that the discharge passage 150 is surrounded by the reservoir 200 inside the housing 100. However, the arrangement of the discharge passage 150 is not limited to the example described above.

Although not shown in the drawing, the cartridge 10 may include at least one air entry passage for air (hereinafter referred to as external air) outside of the cartridge 10 or the aerosol generating apparatus 1000 to flow into the housing 100.

The external air may flow through at least one air entry passage into a space in which aerosols are generated by the discharge passage 150 or atomizer 400 inside the cartridge 10. The introduced external air may be mixed with vaporized particles generated from the aerosol generating material, and as a result, aerosols may be generated.

According to an embodiment, the cross-sectional shape in a direction transverse to the longitudinal direction of the cartridge 10 and/or the main body 20 of the aerosol generating apparatus 1000 may be circular, elliptical, square, rectangular, or other various types of polygons. However, the cross-sectional shape of the cartridge 10 and/or the main body 20 is not limited to the shape described above, and the aerosol generating apparatus 1000 may not extend in a straight line in the longitudinal direction.

In another embodiment, the aerosol generating apparatus 1000 may be curved in a streamline shape for the user to comfortably hold the aerosol generating apparatus 1000 or may have a portion bent at a predetermined angle. The cross-sectional shape of the aerosol generating apparatus 1000 may change along the longitudinal direction.

FIG. 3 is a perspective view of a cartridge according to an embodiment, and FIG. 4 is an exploded perspective view of a cartridge according to an embodiment. FIG. 5 is a cross-sectional view of the cartridge shown in FIG. 3 along an A-A' direction, and FIG. 6 is a cross-sectional view of the cartridge shown in FIG. 3 along a B-B' direction.

The cartridge 10 according to the embodiment shown in FIGS. 3 to 6 may be the cartridge 10 of the aerosol generating apparatus 1000 shown in FIG. 2, and thus redundant descriptions will be omitted.

Referring to FIGS. 3, 4, 5, and 6, the cartridge 10 according to an embodiment may include the housing 100, the discharge passage 150, the mouthpiece 160, the reservoir 200, the liquid delivery element 300, the atomizer 400, and the printed circuit board 500. The components of the cartridge 10 according to an embodiment are not limited to the examples described above, and any one configuration may be added, or any one configuration (for example, the mouthpiece 160) may be omitted according to the embodiment.

The housing 100 may form the overall outer shape of the cartridge 10, and form an internal space in which the components of the cartridge 10 may be arranged. Although the overall shape of the housing 100 of the cartridge 10 is a square column in the drawings, the shape of the housing 100 is not limited thereto. In another embodiment (not shown), the housing 100 may be formed in a cylindrical shape, or a polygonal column (e.g., a triangular column, a pentagonal column) shape other than a square column, overall.

According to one embodiment, the housing 100 may include a first housing 110 and a second housing 120 connected to a portion of the first housing 110. The first housing 110 and the second housing 120 may protect the components of the cartridge 10 which are arranged in the inner space formed by the coupling of the first housing 110 and the second housing 120.

For example, the first housing 110 (or an "upper housing") is coupled to an upper end (e.g., z direction) of the second housing 120 (or "lower housing"), thereby forming, between the first housing 110 and the second housing 120, an inner space in which the components of the cartridge 10 may be arranged, but embodiments are not limited thereto.

In this disclosure, "upper end" may refer to the end portion in the "+z" direction of FIGS. 3 to 6, and "lower end" may refer to the end portion in the "−z" direction of FIGS. 3 to 6, and the expressions will be used for the same meaning below.

The mouthpiece 160, which may be inserted into the mouth of the user, may be connected to the housing 100. For example, the mouthpiece 160 may be connected to a portion (for example, an upper end portion) of the first housing 110, and the opposite portion of the first housing 110 may be connected to the second housing 120.

In an embodiment, the mouthpiece 160 may be detachably coupled to the housing 100, but the mouthpiece 160 may be formed integrally with the housing 100, according to embodiments.

The mouthpiece 160 may include at least one outlet 160*e* for discharging the aerosol generated from the inside of the cartridge 10 to the outside of the cartridge 10. The user may contact the mouthpiece 160 with the mouth and be provided with the aerosol that is discharged to the outside through the outlet 160*e* of the mouthpiece 160.

The reservoir 200 may be arranged in the inner space of the first housing 110, and the aerosol generating material may be stored in the reservoir 200. For example, a liquid aerosol generating material may be stored in the reservoir 200, but embodiments are not limited thereto.

The liquid delivery element 300 may be located between the reservoir 200 and the atomizer 400, and the aerosol generating material stored in the reservoir 200 may be supplied to the atomizer 400 through the liquid delivery element 300.

According to an embodiment, the liquid delivery element 300 may receive the aerosol generating material from the reservoir 200, and may deliver the received aerosol generating material to the atomizer 400. For example, the liquid delivery element 300 may absorb the aerosol generating material moving in a direction from the reservoir 200 to the liquid delivery element 300, and the absorbed aerosol generating material may be move along the liquid delivery element 300 and supplied to the atomizer 400.

According to an embodiment, the liquid delivery element 300 may include a plurality of liquid delivery elements. For example, the liquid delivery element 300 may include a first liquid delivery element 310 and a second liquid delivery element 320.

The first liquid delivery element 310 may be arranged adjacent to the reservoir 200 to receive the liquid aerosol generating material from the reservoir 200. For example, the first liquid delivery element 310 may receive the aerosol generating material from the reservoir 200 by absorbing at least some of the aerosol generating material discharged from the reservoir 200.

For example, the aerosol generating material stored in the reservoir 200 may be discharged to the outside of the reservoir 200 through a liquid supply hole (not shown) formed in an area of the reservoir 200 facing the first liquid delivery element 310, but embodiments are not limited thereto.

The second liquid delivery element 320 may be located between the first liquid delivery element 310 and the atomizer 400, and deliver the aerosol supplied from the first liquid delivery element 310 to the atomizer 400. For example, the second liquid delivery element 320 may be located in a lower end (i.e., end portion in the −z direction) of the first liquid delivery element 310, and the aerosol generating material absorbed by the first liquid delivery element 310 may be supplied to the atomizer 400.

In an embodiment, a portion of the second liquid delivery element 320 may contact a lower end of the first liquid delivery element 310, and the opposite portion of the second liquid delivery element 320 may contact an upper end of the atomizer 400.

That is, the atomizer 400, the second liquid delivery element 320, and the first liquid delivery element 310 may be sequentially arranged in the longitudinal direction (i.e., +z direction) of the cartridge 10 or the housing 100. In other words, the second liquid delivery element 320 and the first liquid delivery element 310 may be sequentially stacked on the atomizer 400.

At least some of the aerosol generating material supplied from the reservoir 200 to the first liquid delivery element 310 may move to the second liquid delivery element 320 in contact with the first liquid delivery element 310. Further, the aerosol generating material moved to the second liquid delivery element 320 may move along the second liquid delivery element 320 and reach the atomizer 400 in contact with the second liquid delivery element 320.

Although the liquid delivery element 300 includes two liquid delivery elements in the drawings, the liquid delivery element 300 may include one liquid delivery element or three or more liquid delivery elements, according to embodiments.

The atomizer 400 may atomize the liquid aerosol generating material supplied from the liquid delivery element 300 to generate an aerosol.

For example, the atomizer 400 may include the vibrator that generates ultrasonic vibration. The frequency of ultrasonic vibration generated in the vibrator may be about 100 kHz to about 10 MHz, for example, about 100 kHz to about 3.5 MHz. As the vibrator generates ultrasonic vibration in the frequency band described above, the vibrator may vibrate along the longitudinal direction (e.g., +z direction and −z direction) of the cartridge 10 or the housing 100. However, the embodiments are not limited thereto, and the direction in which the vibrator vibrates may be changed to various directions (e.g., +z and −z directions, +x and −x directions, +y and −y directions).

By using an ultrasonic vibration method, the atomizer 400 may generate an aerosol at a relatively low temperature compared to a heating method where the aerosol generating material is atomized by heating. For example, in the case of heating the aerosol generating material by using the heater, the aerosol generating material may be heated to a temperature of 200° C. or more, causing the user to feel a burnt taste in the aerosol.

The cartridge 10 according to an embodiment may generate an aerosol at a temperature of about 100° C. to about 160° C., which is lower than when the aerosol generating material is heated with the heater, by atomizing the aerosol generating material through the ultrasonic vibration method. Accordingly, the cartridge 10 may minimize the burnt taste in the aerosol, thereby improving the smoking sensation of the user.

In this disclosure, "smoking sensation" may mean a sense felt by the user during smoking.

The atomizer 400 may be electrically connected to an external power source (e.g., a battery 510 located inside the main body 20 of FIG. 2) through the printed circuit board 500, and may generate ultrasonic vibration by power supplied from the external power source. For example, the atomizer 400 may be electrically connected to the printed circuit board 500 located inside the cartridge 10, and the printed circuit board 500 may be electrically connected to the power source outside of the cartridge 10, thereby enabling the atomizer 400 to receive power from the external power source.

According to an embodiment, the atomizer 400 may be electrically connected to the printed circuit board 500 through a first conductor 410 and a second conductor 420.

In an embodiment, the first conductor 410 may include a material (e.g., metal) having electrical conductivity, and may be located at the upper end of the atomizer 400, thereby electrically connecting the atomizer 400 to the printed circuit board 500.

For example, a portion of the first conductor 410 (e.g., the upper portion) may be arranged to surround at least an area of the outer circumferential surface of the atomizer 400 and contact the atomizer 400, and the other portion (e.g., the lower portion) of the first conductor 410 may contact the printed circuit board 500. Accordingly, the atomizer 400 and the printed circuit board 500 may be electrically connected with each other.

For example, an opening 410*h* may be formed in the first conductor 410 such that at least a portion of the atomizer 400 is exposed to the outside of the first conductor 410. A portion of the atomizer 400 exposed to the outside of the first conductor 410 through the opening 410*h* of the first conductor 410 may contact the second liquid delivery element 320, thereby receiving the aerosol generating material from the second liquid delivery element 320.

In an embodiment, the second conductor 420 may include a material having electrical conductivity, and may be located at the lower end of the atomizer 400 or between the atomizer 400 and the printed circuit board 500, thereby electrically connecting the atomizer 400 to the printed circuit board 500. For example, one end of the second conductor 420 may contact the lower end of the atomizer 400, and the other end of the second conductor 420 may contact an area of the printed circuit board 500 facing the atomizer 400, thereby electrically connecting the atomizer 400 to the printed circuit board 500.

According to an embodiment, the second conductor 420 may include a conductive material having an elasticity, thereby elastically supporting the atomizer 400 in addition to electrically connecting the atomizer 400 to the printed circuit board 500. For example, the second conductor 420 may include a conductive spring, but the second conductor 420 is not limited to the embodiment described above.

The cartridge 10 according to an embodiment may further include an elastic support 430 that is located between the atomizer 400 and the printed circuit board 500, thereby supporting the second conductor 420. The elastic support 430 may include, for example, a material having a flexible characteristic, and may be arranged to wrap the outer circumferential surface of the second conductor 420 to elastically support the second conductor 420. However, the embodiment of the cartridge 10 is not limited thereto, and the elastic support 430 may be omitted according to embodiments.

According to an embodiment, the printed circuit board 500 may be located inside the second housing 120, and may be electrically connected to the atomizer 400 through the first conductor 410 and the second conductor 420, while also being electrically connected to an external power source (e.g., the battery 510 of FIG. 2) through an electrical connection member (not shown).

The electrical connection member may include, for example, a pogo pin, a wire, a cable, an FPCB, or a C-clip, but the electrical connection member is not limited to the examples described above.

In an embodiment, the second housing 120 may include a plurality of through holes 121, 122, and 123 (hereinafter, also referred to as a first through hole 121, a second through hole 122, and a third through hole 123) that provides fluid communication between the inside of the second housing 120 and the outside of the cartridge 10. An electrical connection member may be arranged in the plurality of through holes 121, 122, and 123, thereby electrically connecting the printed circuit board 500 located inside the cartridge 10 to the power source outside the cartridge 10.

That is, the printed circuit board 500 may be electrically connected to the atomizer 400 through the first conductor 410, while being also electrically connected to the power source outside the cartridge 10 through the electrical connection member. As a result, the atomizer 400 may receive power from the external power source via the printed circuit board 500.

The printed circuit board 500 may include a resistor R for removing the noise (or "noise signal") occurred during the operation of the cartridge 10. Accordingly, the resistor R may prevent the atomizer 400 from being damaged by removing the noise. The operation of removing the noise by the resistor R will be described in detail below.

The aerosol atomized by the ultrasonic vibration generated in the atomizer 400 may be discharged to the outside of the cartridge 10 through the discharge passage 150 and provided to the user. For example, the discharge passage 150 may enable the inner space of the housing 100 to communicate with the outlet 160*e* of the mouthpiece 160. Thus, the aerosol generated by the atomizer 400 may flow along the discharge passage 150 and be discharged to the outside of the cartridge 10 through the outlet 160*e*.

According to an embodiment, the discharge passage 150 may be located in the inner space of the housing 100, and at least a portion of the discharge passage 150 may be surrounded by the reservoir 200, but embodiments are not limited thereto.

The cartridge 10 according to an embodiment may further include a sealing element 130 for preventing leakage from the reservoir 200 from flowing into the discharge passage 150.

When the reservoir 200 is arranged to surround the discharge passage 150, the leakage from the reservoir 200 may flow into the discharge passage 150, deteriorate the smoking sensation of the user.

In this regard, the cartridge 10 according to an embodiment may prevent the leakage from the reservoir 200 from flowing into the discharge passage 150 by the sealing element 130, thereby preventing the deterioration of the smoking sensation of the user.

In an embodiment, the sealing element 130 may be located inside the discharge passage 150 to prevent the leakage from flowing into the discharge passage 150. For example, the sealing element 130 may be in close contact with an inner wall of the discharge passage 150 by being fit to the discharge passage 150, but embodiments are not limited thereto.

In addition, the sealing element 130 may be formed in a hollow shape, thereby preventing the leakage from the reservoir 200 from flowing into the discharge passage 150, while not interfering with the movement of the aerosol generated from the atomizer 400.

In another embodiment, the sealing element 130 may absorb the ultrasonic vibration generated from the atomizer 400 by including a material (e.g., rubber) having elasticity, and as a result, may minimize the ultrasonic vibration generated in the atomizer 400 being delivered to the user through the housing 100 of the cartridge 10.

In another embodiment, the sealing element 130 may be located at the upper end of the liquid delivery element 300, and by applying pressure to the liquid delivery element 300 in a direction toward the atomizer 400, a contact between the liquid delivery element 300 and the atomizer 400 may be maintained. For example, the sealing element 130 may apply pressure to the first liquid delivery element 310 and/or the second liquid delivery element 320 in the −z direction, and thus a contact between the second liquid delivery element 320 and the atomizer 400 may be maintained.

The cartridge 10 according to an embodiment may further include a structure 140 for preventing droplets bouncing from the atomizer 400 from being provided to the user, and a first support element 141 for fixing or supporting the structure 140.

In the process in which the aerosol generating material is atomized by the ultrasonic vibration generated in the atomizer 400, some of the aerosol generating material may not be atomized, resulting in the generation of droplets. The generated droplets may bounce due to the ultrasonic vibration generated in the atomizer 400 and be discharged to the outside of the cartridge 10 through the outlet 160*e*.

The structure 140 may be arranged at a position adjacent to the discharge passage 150 and restrict the movement or flow of the bounced droplets in a direction toward the outlet 160*e* of the mouthpiece 160.

For example, the structure 140 may include a material (e.g., a felt material) capable of absorbing the droplets bouncing from the atomizer 400 such that the movement or flow of the droplets toward the outlet 160*e* is restricted, but embodiments are not limited thereto.

When the droplets that bounce from the atomizer 400 are discharged to the outside of the cartridge 10 through the outlet 160*e* and delivered to the user, the user may feel uncomfortable and the overall smoking sensation may be deteriorated.

In this regard, the cartridge 10 according to an embodiment may include the structure 140 that prevents the droplets that have not been atomized from bouncing from the atomizer 400 toward the outlet 160*e*, thereby minimizing the deterioration of smoking sensation of the user due to the splash of droplets. In the present disclosure, "splash of droplets" may mean that the droplets that have not been atomized in the atomizer 400 are bounced off.

The first support element 141 may accommodate at least a portion of the structure 140, and maintain or fix the position of the accommodated portion of the structure 140 with respect to the first housing 110. For example, the first support element 141 may maintain or fix the structure 140 in a portion (e.g., an upper region) of the first housing 110 adjacent to the mouthpiece 160, but embodiments are not limited thereto.

In an embodiment, the first support element 141 may be arranged to surround at least a portion of the structure 140 to accommodate the structure 140. Because the first support element 141 accommodating the structure 140 is coupled to the first housing 110, the structure 140 may also be fixed to the first housing 110.

The first support element 141 accommodating the structure 140 may be coupled to the first housing 110 by an interference fit, but the method of coupling the first housing 110 to the first support element 141 is not limited thereto. In another example, the first housing 110 and the first support element 141 may be coupled by at least one of a snap-fit method, a screw connection method, or a magnetic force coupling method.

The first support element 141 may include a material (e.g., rubber) having a certain rigidity and waterproofness. As such, the first support element 141 may not only fix the structure 140 to the first housing 110, but also prevent the aerosol generating material leaking from the reservoir 200. For example, the first support element 141 may prevent the leakage of the aerosol generating material by blocking a portion of the reservoir 200 which faces the mouthpiece 160.

The cartridge 10 according to an embodiment may further include a second support element 330 for maintaining the liquid delivery element 300 and/or the atomizer 400 inside the first housing 110.

The second support element 330 may be arranged to surround at least a portion of the first liquid delivering unit 310, the second liquid delivering unit 320, and/or the atomizer 400, thereby accommodating the first liquid delivering unit 310, the second liquid delivering unit 320, and/or the atomizer 400.

In an embodiment, the second support element 330 may be coupled to the lower portion (e.g., an end portion in the −z direction) of the first housing 110. As a result, the first liquid delivering unit 310, the second liquid delivering unit 320, and/or the atomizer 400 may be maintained or fixed to the lower portion of the first housing 110.

The second support element 330 may be coupled to the first housing 110 by an interference fit, but the method of coupling the first housing 110 to the second support element 330 is not limited thereto. In another example, the first housing 110 and the second support element 330 may be coupled by at least one of a snap-fit method, a screw connection method, or a magnetic force coupling method.

According to an embodiment, the second support element 330 may include a material (e.g., rubber) having a certain rigidity and waterproofness. As such, the second support element 330 may not only fix the liquid delivery element 300 and the atomizer 400 to the first housing 110, but also prevent the aerosol generating material from leaking from the reservoir 200. For example, the second support element 330 may prevent the leakage of the aerosol generating material by blocking a portion of the reservoir 200 adjacent to the liquid delivery element 300 or the atomizer 400.

Hereinafter, with reference to FIGS. 7 to 9, an electrical connection structure between the atomizer 400 and the printed circuit board 500 and an electrical connection between the resistor R mounted on the printed circuit board 500 and the atomizer 400 will be described in detail.

FIG. 7 is an exploded perspective view illustrating an electrical connection between the vibrator of the cartridge and the printed circuit board, FIG. 8 is a cross-sectional view illustrating an electrical connection between the vibrator of the cartridge and the printed circuit board shown in FIG. 7, and FIG. 9 is a circuit diagram showing an electrical connection between the vibrator of the cartridge and the resistor mounted on the printed circuit board shown in FIG. 7.

FIGS. 7 and 8 show some components (e.g., the atomizer 400, the first conductor 410, the second conductor 420, and the printed circuit board 500) of the cartridge 10 shown in FIGS. 3 to 6 for convenience of description, but the components of the cartridge 10 are not limited to the illustrated embodiment.

Referring to FIGS. 7, 8 and 9, a cartridge according to an embodiment (e.g., the cartridge 10 of FIGS. 3 to 6) may include the atomizer 400, the printed circuit board 500, the first conductor 410, and the second conductor 420. The first conductor 410 and the second conductor 420 electrically connect the atomizer 400 to the printed circuit board 500.

The printed circuit board 500 may include a first surface facing the atomizer 400, and a second surface opposite to the first surface. A plurality of electrical contacts may be arranged on the first surface and the second surface of the printed circuit board 500 to electrically connect the printed circuit board 500 to the atomizer 400 and/or an external power source (e.g., the battery 510 of FIG. 2).

According to an embodiment, a first electrical contact 501 and a second electrical contact 502 arranged apart from the first electrical contact 501 may be arranged on the first surface of the printed circuit board 500.

A portion (e.g., upper portion) of the first conductor 410 may be arranged to surround at least a portion of the outer circumferential surface of the atomizer 400 and contact the atomizer 400, and another portion (e.g., "lower portion") of the first conductor 410 may contact the first electrical contact 501 of the printed circuit board 500. The atomizer 400 and the first electrical contact 501 may be electrically connected by the arrangement and structure of the first conductor 410 described above.

The second conductor 420 may be located between the atomizer 400 and the printed circuit board 500. For example, one end (e.g., end portion in the +z direction) of the second conductor 420 may contact an area of the atomizer 400 facing the printed circuit board 500, and the opposite end (e.g., end portion in the −z direction) of the second conductor 420 may contact the second electrical contact 502 of the printed circuit board 500. The atomizer 400 and the second electrical contact 502 may be electrically connected by the arrangement and structure of the second conductor 420 described above.

According to an embodiment, the atomizer 400 may include a first electrode 401 (or "upper electrode") arranged at a portion of the atomizer 400 in a direction opposite to the printed circuit board 500, and a second electrode 402 (or "lower electrode") arranged at a portion of the atomizer 400 facing the printed circuit board 500.

The first electrode 401 and/or the second electrode 402 may include a material having a high electrical conductivity, and may electrically connect the atomizer 400 to the first conductor 410 and/or the second conductor 420. The first electrode 401 and/or the second electrode 402 may include any one of, for example, silver (Ag), copper (Cu), gold (Au), aluminum (Al), tungsten (W), iron (Fe), platinum (Pt), or lead (Pb), but is not limited thereto.

In the figures, the first electrode 401 is arranged along the edge of the atomizer 400, and the second electrode 402 is arranged in the center of atomizer 400 facing the printed circuit board 500. However, the arrangement and structure of the first electrode 401 and/or the second electrode 402 are not limited to the illustrated embodiment. In another embodiment, the first electrode 401 may be arranged only at a portion of the edge of the atomizer 400, or the second electrode 402 may be arranged at a side rather than the center of the atomizer 400.

In an embodiment, a portion of the first conductor 410 may be arranged to surround and contact the outer circumferential surface of the atomizer 400 where the first electrode 401 is arranged. In another example, the first electrode 401 may be arranged on the top surface of the atomizer 400, and the inner wall of the upper end of the first conductor 410 protruding inwardly may contact the first electrode 401. On the other hand, another portion of the first conductor 410 may contact the first electrical contact 501 of the printed circuit board 500. As a result, the atomizer 400 may be electrically connected to the first electrical contact 501.

Also, one end of the second conductor 420 may contact the second electrode 402 of the atomizer 400, and the other end of the second conductor 420 may contact the second electrical contact 502 of the printed circuit board 500, thereby electrically connecting the atomizer 400 to the second electrical contact 502.

That is, the cartridge 10 according to an embodiment may electrically connect the atomizer 400 to the printed circuit board 500 by the first conductor 410 in contact with the first electrode 401 of the atomizer 400 and the first electrical contact 501 of the printed circuit board 500, and a second conductor 420 in contact with the second electrode 402 of the atomizer 400 and the second electrical contact 502 of the printed circuit board 500.

According to an embodiment, a third electrical contact 501-1 and a fourth electrical contact 502-1 may be arranged on the second surface opposite to the first surface of the printed circuit board 500.

In an embodiment, the third electrical contact 501-1 may be placed in a position corresponding to the first electrical contact 501 arranged on the first surface of the printed circuit board 500, and may be electrically connected to the first electrical contact 501 through a first conductive via V1.

For example, the third electrical contact 501-1 may be placed at a position that overlaps with the first electrical contact 501 when viewed from the first surface of the printed circuit board 500, and the first conductive via V1 may be located between the first electrical contact 501 and the third electrical contact 501-1, thereby connecting the first electrical contact 501 to the third electrical contact 501-1.

The first conductive via V1 may be arranged to pass through the first surface and the second surface of the printed circuit board 500, thereby electrically connecting the first electrical contact 501 to the third electrical contact 501-1.

In an embodiment, the fourth electrical contact 502-1 may be placed in a position corresponding to the second electrical contact 502 arranged on the first surface of the printed circuit board 500, and may be electrically connected to the second electrical contact 501 through a second conductive via V2.

For example, the fourth electrical contact 502-1 may be placed at a position that overlaps with the second electrical contact 502 when viewed from the first surface of the printed circuit board 500, and the second conductive via V2 may be located between the second electrical contact 502 and the fourth electrical contact 502-1, thereby connecting the second electrical contact 502 to the fourth electrical contact 502-1.

The second conductive via V2 may be arranged to pass through the first surface and the second surface of the printed circuit board 500, thereby electrically connecting the second electrical contact 502 to the fourth electrical contact 502-1.

The third electrical contact 501-1 may be arranged at a position corresponding to the first through hole (e.g., the first through hole 121 of FIG. 5) of the second housing (e.g. the second housing 120 of FIG. 5), and may be electrically connected to the external power source through the electrical connection member arranged inside the first through hole. For example, the third electrical contact 501-1 may be electrically connected to the battery (e.g., the battery 510 of FIG. 2) of the main body (e.g., the main body 20 of FIG. 2) through the electrical connection member arranged in the first through hole.

Further, the fourth electrical contact 502-1 may be arranged at a position corresponding to a second through hole (e.g., the second through hole 122 of FIG. 5) of the second housing 120, and may be electrically connected to the external power source through the electrical connection member arranged inside the second through hole. For example, the fourth electrical contact 502-1 may be electrically connected to the battery of the main body through the electrical connection member arranged inside the second through hole.

The printed circuit board 500 of the cartridge 10 according to an embodiment may operate as a medium for electrically connecting the atomizer 400 to the external power source (e.g., the battery of the main body) by having a structure in which the first electrical contact 501 and the second electrical contact 502 are arranged on the first surface, and the third electrical contact 501-1 and the fourth electrical contact 502-1 electrically connected to the first electrical contact 501 and the second electrical contact 502, respectively, are arranged on the second surface.

Because the first electrical contact 501 and the second electrical contact 502 of the printed circuit board 500 are electrically connected to the atomizer 400, and the third electrical contact 501-1 and the fourth electrical contact 502-1 of the printed circuit board 500 are electrically connected to the battery of the main body, an electrical circuit may be formed between the atomizer 400 and the external power source.

Through the electrical circuit formed between the atomizer 400 and the external power source, the atomizer 400 may receive power from the external power source to atomize the aerosol generating material into an aerosol. For example, the power supplied from the external power source may be transmitted to the atomizer 400 through the printed circuit board 500 arranged inside the cartridge, and the atomizer 400 may generate the aerosol by generating ultrasonic vibration through the received power.

According to an embodiment, the printed circuit board 500 may further include a fifth electrical contact 503 arranged on the first surface and a sixth electrical contact 503-1 arranged on an area of the second surface corresponding to the fifth electrical contact 503.

The fifth electrical contact 503 may be placed at a position that corresponds to or overlaps with the sixth electrical contact 503-1 when viewed from the first surface of the printed circuit board 500, and a third conductive via V3 may be located between the fifth electrical contact 503 and the sixth electrical contact 503-1, thereby electrically connecting the fifth electrical contact 503 to the sixth electrical contact 503-1.

In an example, because the fifth electrical contact 503 may be electrically connected to the first conductor 410, the atomizer 400 may be electrically connected to the first electrical contact 501.

The sixth electrical contact 503-1 may be arranged at a position corresponding to a third through hole (e.g., the third through hole 123 of FIG. 5) of the second housing 120, and may be electrically connected to the external power source (e.g., the battery of the main body) through the electrical connection member arranged inside the third through hole.

In the cartridge according to an embodiment, because two electrical contacts (the first electrical contact 501 and the fifth electrical contact 503) arranged on the first surface of the printed circuit board 500 are electrically connected to the first conductor 410, the atomizer 400 may be electrically connected to the printed circuit board 500 if the first conductor 410 is in contact with any one of the two electrical contacts.

Because the atomizer 400 may be electrically connected to the printed circuit board 500 as long as the first conductor 410 is in contact with any one of the first electrical contact 501 and the fifth electrical contact 503, the electrical connection between the atomizer 400 and the printed circuit board 500 may be maintained regardless of the direction of arrangement of the printed circuit board 500.

The first electrical contact 501 through the sixth electrical contact 503-1 may be, for example, a conductive pad or a soldering pad mounted on the printed circuit board 500, but are not limited thereto.

The resistor R may be arranged in the printed circuit board 500. The resistor R may remove or filter noise occurring when power is supplied from the external power source to the atomizer 400 or noise occurring in a circuit of the printed circuit board 500.

According to an embodiment, the resistor R may be mounted on an area of the printed circuit board 500 to eliminate the noise that occurs when the aerosol generating apparatus operates (or when power is turned on), thereby stabilizing the voltage supplied to the atomizer 400.

When power starts to be supplied to the atomizer 400, or during the process of supplying power to the atomizer 400, noise may occur in the electrical circuit between the atomizer 400 and the external power source. For example, a higher voltage than a designated value may be applied to the atomizer 400 due to the noise in the voltage signal provided to the atomizer 400. As a result, the temperature of the atomizer 400 may rise sharply (e.g., rise above the Curie temperature), thereby damaging the atomizer 400.

In this regard, the cartridge according to an embodiment may eliminate or filter the noise occurring in the electrical circuit formed between the atomizer 400 and the external power source by using the resistor R mounted on the printed circuit board 500. As a result, the cartridge or the aerosol generating apparatus may operate stably.

According to an embodiment, as shown in FIG. 9, the resistor R may eliminate or filter the noise included in the voltage signal applied to the atomizer 400 by forming a feedback circuit electrically connected in parallel with the atomizer 400.

In an embodiment, the resistor R may be electrically connected to the first electrical contact 501 (or the fifth electrical contact 503) and the second electrical contact 502 to be connected in parallel with the atomizer 400. For example, the resistor R may be electrically connected to the first conductive via V1 (or the third conductive via V3) and the second conductive via V2 in the printed circuit board 500, but embodiments are not limited thereto.

The resistor R may allow a stable voltage to be applied to the atomizer 400 by removing the noise included in the voltage signal applied to the atomizer 400 by forming the feedback circuit. As a result, damage to the atomizer 400 by the noise may be prevented, thereby enabling a stable operation of the cartridge or the aerosol generating apparatus.

According to an embodiment, the printed circuit board 500 may be arranged inside the cartridge to be adjacent to the atomizer 400, and the resistor R may be arranged or mounted on the first surface of the printed circuit board 500 facing the atomizer 400. Otherwise, if the resistor R is arranged on the second surface of the printed circuit board 500, or on the main body (e.g., the main body 20 of FIG. 2) instead of the cartridge 10, the electrical length of the feedback circuit may increase. When the electrical length of the feedback circuit increases, noise may additionally occur during a feedback process of the voltage signal applied to the atomizer 400, and thus a voltage signal applied to the atomizer 400 may be affected by the noise despite the feedback circuit.

In this regard, in the cartridge according to an embodiment, the printed circuit board 500 is arranged in a within a designated distance from the atomizer 400, and the resistor R forming the feedback circuit is arranged on the first surface of the printed circuit board 500 adjacent to the atomizer 400, such that the electrical length of the feedback circuit is not too long. As a result, additional noise may be prevented from occurring during a feedback process of the voltage signal applied to the atomizer 400, and thus a stable voltage signal may be provided to the atomizer 400.

In this disclosure, "a designated distance" between the printed circuit board 500 and the atomizer 400 may refer to a distance to prevent noise from occurring during the feedback process of the voltage signal.

In the cartridge according to an embodiment, the printed circuit board 500 on which the resistor R is mounted may be arranged inside the cartridge instead of the main body such that stable voltage may be provided to the atomizer 400. As a result, damage to the atomizer 400 may be prevented and the cartridge and aerosol generating apparatus may operate stably.

The resistor R may be mounted on the first surface of the printed circuit board 500 in various ways. For example, the resistor R may be electrically connected to the printed circuit board 500 by a surface mount method in which the resistor R protrudes from the first surface of the printed circuit board 500, or by a method in which at least a portion of the resistor R is embedded in the first surface of the printed circuit board 500.

According to an embodiment, the resistor R may have a resistance value of about 0.8 MΩ to about 1.2 MΩ to eliminate noise included in the voltage signal applied to the atomizer 400. However, the resistance value of the resistor R may be altered according to the embodiment.

FIG. 10 is a graph showing a change in the voltage applied to the vibrator of the cartridge, according to an embodiment.

FIG. 10 shows a change in the voltage signal applied to the atomizer 400 over time when the resistor R is mounted on the printed circuit board 500 in the cartridge, according to the embodiment illustrated in FIGS. 7 and 8.

Referring to FIG. 10, in a cartridge according to an embodiment, the noise included in the voltage signal applied to the atomizer may be eliminated or filtered, because the printed circuit board is arranged inside the cartridge, and the resistor (e.g., the resistor R of FIGS. 7 and 8) connected in parallel with the atomizer (e.g., the atomizer 400 of FIGS. 7 and 8) is mounted on the printed circuit board.

Because the resistor eliminates the noise occurred during a process of applying voltage to the atomizer, only components corresponding to the resonance frequency may remain in the voltage signal applied to the atomizer, and thus stable voltage may be provided to the atomizer.

That is, the cartridge and the aerosol generating apparatus including the same may prevent an excessively high voltage from being applied to the vibrator by the resistor which is mounted on the printed circuit board placed adjacent to the atomizer and removes the noise occurred during the operation of the cartridge or the aerosol generating apparatus. As a result, the cartridge and the aerosol generating apparatus including the same according to the embodiments described above may prevent damage to the atomizer, and thus operate stably.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the disclosure should be defined by the appended claims, and all differences within the scope equivalent to those described in the claims will be construed as being included in the scope of protection defined by the claims.

The invention claimed is:

1. A cartridge comprising:

a housing;

a reservoir located in the housing and configured to store an aerosol generating material;

an atomizer located in the housing and configured to generate vibration to atomize the aerosol generating material to an aerosol;

a liquid delivery element configured to absorb the aerosol generating material stored in the reservoir and deliver the absorbed aerosol generating material to the atomizer, wherein the liquid delivery element comprises at least one of cotton fiber, ceramic fiber, glass fiber, or porous ceramic; and a resistor located in the housing wherein the resistor and the atomizer are connected in parallel to form a feedback circuit such that the resistor eliminates a noise in a voltage signal applied to the atomizer.

2. The cartridge of claim 1, further comprising a printed circuit board located in the housing and electrically connected to the atomizer, wherein the resistor is arranged in the printed circuit board.

3. The cartridge of claim 2, wherein the printed circuit board is arranged within a designated distance from the atomizer.

4. The cartridge of claim 2, wherein the resistor is arranged at an area of the printed circuit board facing the atomizer.

5. The cartridge of claim 2, further comprising:

a first electrical contact arranged on a first surface of the printed circuit board facing the atomizer; and a second electrical contact arranged apart from the first electrical contact on the first surface of the printed circuit board.

6. The cartridge of claim 5, wherein the resistor forms a feedback circuit by being electrically connected to the first electrical contact and the second electrical contact.

7. The cartridge of claim 5, further comprising:

a first conductor electrically connecting the atomizer and the first electrical contact; and a second conductor electrically connecting the atomizer and the second electrical contact.

8. The cartridge of claim 7, wherein a first portion of the first conductor is arranged to surround at least a portion of the atomizer, and a second portion of the first conductor extends from the first portion toward the first surface of the printed circuit board, thereby contacting the first electrical contact.

9. The cartridge of claim 7, wherein the second conductor is located between the atomizer and the printed circuit board, and one end of the second conductor contacts an area of the atomizer facing the printed circuit board and another end of the second conductor contacts the second electrical contact.

10. The cartridge of claim 9, wherein the second conductor is a conductive spring.

11. The cartridge of claim 5, further comprising:

a third electrical contact arranged on a second surface opposite to the first surface of the printed circuit board and configured receive power from an external power source; and a fourth electrical contact arranged apart from the third electrical contact on the second surface of the printed circuit board and configured to receive power from the external power source.

12. The cartridge of claim 11, wherein the first electrical contact is electrically connected to the third electrical contact through a first conductive via, and the second electrical contact is electrically connected to the fourth electrical contact through a second conductive via.

13. The cartridge of claim 1, further comprising:

a mouthpiece including an outlet for discharging the aerosol; and a discharge passage connecting the atomizer and the outlet such that the aerosol atomized by the atomizer moves along the discharge passage toward the outlet.

14. An aerosol generating apparatus comprising:

a cartridge comprising:

a housing, a reservoir located in the housing and configured to store an aerosol generating material, an atomizer located in the housing and configured to generate vibration to atomize the aerosol generating material to an aerosol, a liquid delivery element configured to absorb the aerosol generating material stored in the reservoir and deliver the absorbed aerosol generating material to the atomizer, wherein the liquid delivery element comprises at least one of cotton fiber, ceramic fiber, glass fiber, or porous ceramic, and a resistor located in the housing wherein the resistor and the atomizer are connected in parallel to form a feedback circuit such that the resistor eliminates a noise in a voltage signal applied to the atomizer;

a main body connected to the cartridge;

a battery arranged in the main body and configured to supply power to the atomizer of the cartridge; and a processor arranged in the main body and configured to control the power supplied to the cartridge from the battery.

* * * * *